(12) United States Patent
Hein

(10) Patent No.: US 7,206,705 B2
(45) Date of Patent: Apr. 17, 2007

(54) METHOD AND APPARATUS FOR BALANCING CAPACITORS IN A CAPACITOR BANK

(75) Inventor: Gerd Hein, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 137 days.

(21) Appl. No.: 10/635,440

(22) Filed: Aug. 7, 2003

(65) Prior Publication Data

US 2004/0090731 A1 May 13, 2004

(30) Foreign Application Priority Data

Aug. 7, 2002 (DE) .............................. 102 36 165

(51) Int. Cl.
*G01R 19/00* (2006.01)

(52) U.S. Cl. .................. 702/64; 702/63; 702/185

(58) Field of Classification Search .................. 702/64, 702/58, 63–65, 107, 117, 182–185; 320/166, 320/167, 148, 149, 161
See application file for complete search history.

(56) References Cited

U.S. PATENT DOCUMENTS

| 5,581,170 | A | | 12/1996 | Mammano et al. | ............ 320/17 |
|---|---|---|---|---|---|
| 5,631,537 | A | | 5/1997 | Armstrong | .................... 320/15 |
| 5,675,233 | A | | 10/1997 | Kaneko et al. | ............... 320/15 |
| 5,910,892 | A | * | 6/1999 | Lyons et al. | .................. 363/98 |
| 5,952,815 | A | | 9/1999 | Rouillard et al. | ........... 320/116 |
| 5,969,505 | A | * | 10/1999 | Okamura | ..................... 320/122 |
| 6,031,738 | A | * | 2/2000 | Lipo et al. | ..................... 363/37 |
| 6,285,161 | B1 | | 9/2001 | Popescu | ..................... 320/118 |
| 6,323,623 | B1 | * | 11/2001 | Someya et al. | ............. 320/166 |
| 6,384,489 | B1 | * | 5/2002 | Bluemel et al. | ........... 307/10.1 |
| 6,777,917 | B2 | * | 8/2004 | Desprez et al. | ............. 320/167 |
| 6,841,971 | B1 | * | 1/2005 | Spee et al. | .................. 320/119 |
| 2003/0067281 | A1 | * | 4/2003 | Wilk et al. | .................. 320/132 |
| 2003/0214267 | A1 | * | 11/2003 | Long | .......................... 320/116 |

FOREIGN PATENT DOCUMENTS

EP 1035627 9/2000

* cited by examiner

*Primary Examiner*—Marc S. Hoff
*Assistant Examiner*—Anthony Gutierrez
(74) *Attorney, Agent, or Firm*—Harness, Dickey & Pierce, P.L.C.

(57) ABSTRACT

A method and apparatus are for balancing capacitors in a capacitor bank. Three voltage levels are produced by a reference voltage source, to monitor the state of charge of the capacitors. The capacitor voltage on each capacitor is determined and is compared with the voltage levels. After the charging of the capacitors, normal operation starts when the capacitor voltage reaches the lowest voltage level and before it has reached the central voltage level. A balancing operation starts when the capacitor voltages of all the capacitors have reached the central voltage level, and ends when the capacitor voltage of all the capacitors has once again reached the lowest voltage level. When the lowest voltage level is reached once again, normal operation starts again. A fault is indicated upon reaching the highest voltage level.

43 Claims, 1 Drawing Sheet

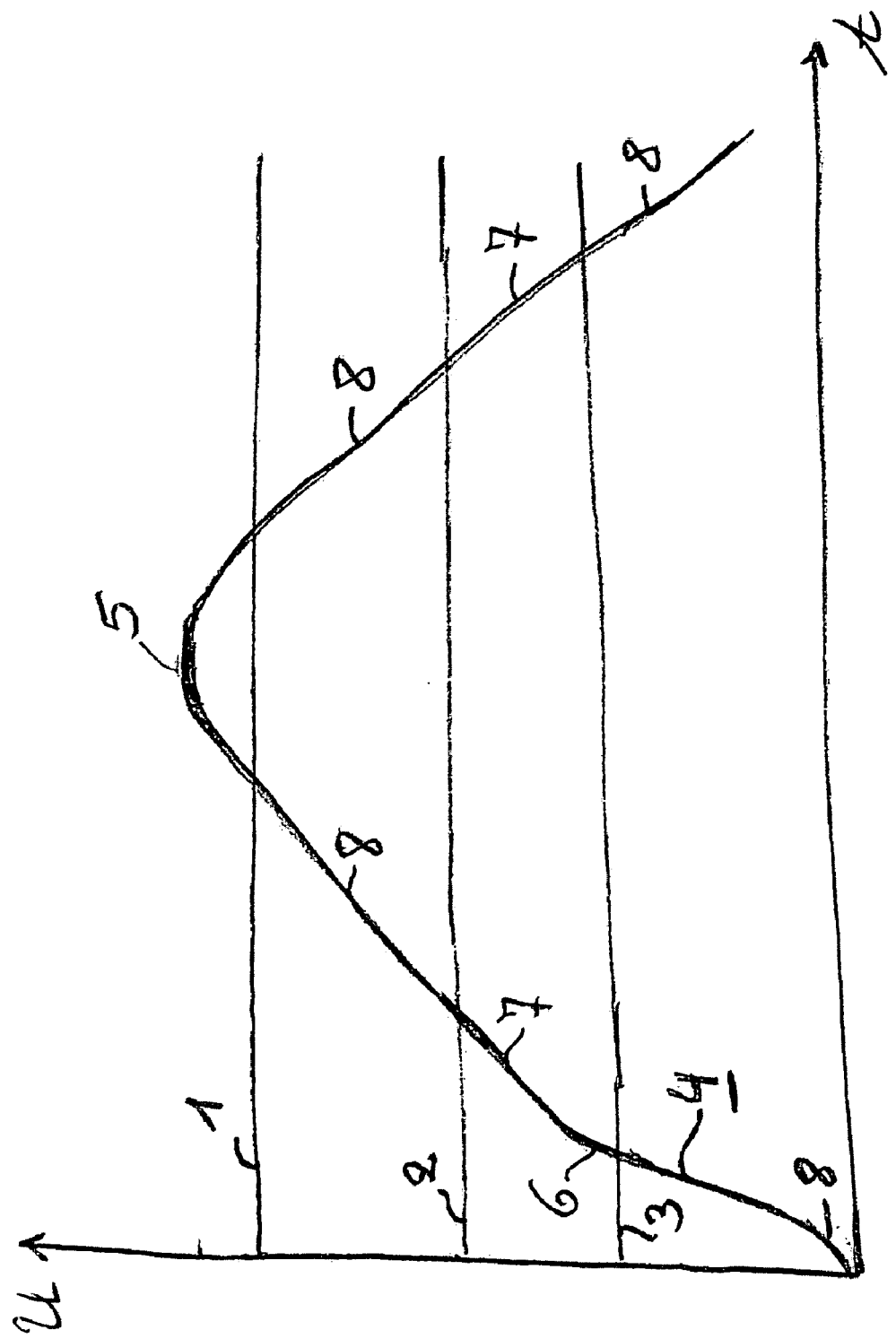

METHOD AND APPARATUS FOR BALANCING CAPACITORS IN A CAPACITOR BANK

The present application hereby claims priority under 35 U.S.C. §119 on German patent application number DE 10236165.7 filed Aug. 7, 2002, the entire contents of which are hereby incorporated herein by reference.

FIELD OF THE INVENTION

The invention generally relates to a method for balancing the capacitors in a capacitor bank, and to an apparatus for carrying out the method.

BACKGROUND OF THE INVENTION

A capacitor bank is frequently used as an energy store, for example in a locomotive or in some other prime-mover rail vehicle, but in particular for stationary use in an overhead line. This capacitor bank includes two or more parallel-connected rows of individual capacitors in each of the rows. These capacitors may be what are referred to as ultracapacitors.

By way of example, the braking energy is temporarily stored in an energy store such as this in order to emit it again when the vehicle drives away. In order to allow as much energy as possible to be stored in a capacitor bank such as this, it is important for all the capacitors in a capacitor bank to be loaded uniformly, that is to say to be charged uniformly and completely. This process is called "balancing".

If a capacitor voltage which is greater than the nominal voltage is present on individual capacitors, even if only for a short time, then this leads to this capacitor ageing more quickly. In the worst case, it must then be removed prematurely, which is costly. Different voltages on the individual capacitors, which make the energy store inefficient, are essentially caused by capacitor characteristics, for example the equivalent series resistance and/or the resistance of the capacitor. Parallel resistances may also have an effect.

It is thus necessary to charge each individual capacitor in a capacitor bank to an upper voltage limit and to protect it against overcharging, which could lead to destruction of the capacitor. If the voltage that is applied is too high, this could lead to bubbles being formed in the electrolyte, which can burn and is toxic. However, it should be possible through the use of a diagnostic process, to identify in good time whether a capacitor is not fully serviceable.

It has already been proposed for voltage balancing to be carried out for all the capacitors (matching of the voltages which are present on the capacitors and the charges on the capacitors), in order that they are charged uniformly.

One known method provides for each capacitor to be charged individually. Small contactors are required to do this, which connect the capacitors to the power supply successively. This method takes a very long time. Furthermore, complex wiring is required.

It has already been proposed for the individual capacitors all to be balanced immediately on reaching a nominal value, with the aim of achieving uniform charging. A discharge path is required in parallel with each capacitor to do this. This method furthermore takes a very long time, if only a small balancing current is possible.

SUMMARY OF THE INVENTION

An embodiment of the invention may be based on an object of specifying a method for uniform charging (balancing) of the capacitors in a capacitor bank. The method preferably operates quickly and reliably and allows greater balancing currents without, however, requiring a large number of additional components. Such components would, if used, occupy a large amount of space and would be highly susceptible to failure, in large capacitor banks with, for example, a thousand capacitors.

An embodiment of the invention also may be directed to an apparatus for carrying out the method.

An object of specifying a method may be achieved, according to an embodiment of the invention, wherein three voltage levels are produced by a reference voltage source in order to monitor the state of charge of the capacitors, the capacitor voltage on each capacitor is determined and is compared with the voltage levels, and wherein a correct charge on a capacitor is indicated when the capacitor voltage is between the two lower voltage levels. Further, a fault in the capacitor may be indicated when the capacitor voltage is greater than the highest voltage level. Also, balancing may be carried out only when neither a correct charge nor a fault is indicated.

BRIEF DESCRIPTION OF THE DRAWING

The FIGURE is a schematic illustration of a method according to an example, non-limiting embodiment of the present invention.

DETAILED DESCRIPTION OF THE PREFERRED EMBODIMENTS

For this method, a simple electronic circuit may be used, in which the number of components required is minimal. The susceptibility to failure is thus likewise low. The balancing quality is ensured by the reference voltage source, since a constant source which is largely free of temperature influences is chosen.

This reference voltage source may produce three voltage levels, which are made available to evaluation electronics with reference to the FIGURE, the lowest level 3 and the central level 2 define a window in which all the capacitors must be after a fault-free charging process. The highest level 1 defines a protection threshold.

With reference to the voltage curve 4 in the FIGURE, overshooting of this highest level 1 (e.g., at segments 5 of the voltage curve 4) may be an indication of a fault. The fault may be indicated visually. It is also possible to use a bus system to inform an evaluation unit of the fault, thus allowing immediate diagnosis of which capacitor has failed. Suitable voltage values for the individual voltage levels are 2.2 V for the lowest voltage level 3, 2.45 V for the central voltage level 2 and 2.7 V for the highest voltage level 1.

The method, according to an embodiment of the invention, advantageously indicates that the balancing and, furthermore the monitoring of the capacitor bank can be carried out quickly and reliably using simple devices.

By way of example, a fault in the capacitor is indicated when the gradient of the voltage on the capacitor during the charging of the capacitor exceeds a limit value (e.g. at segment 6 of the voltage curve 4). This advantageously provides additional capability for identifying a defective capacitor.

The voltage levels 1, 2, 3 may be supplied, for example via optocouplers, to an evaluation device. This transmission method is particularly reliable.

By way of example, the setting up of the reference voltage source makes use of a voltage which is present in the capacitor bank. Advantageously, no additional voltage supply is thus required.

By way of example, the sum voltage across two capacitors in the capacitor bank is tapped off as a voltage source for balancing. The two capacitors are in this case two adjacent capacitors, and this can be done particularly easily.

A converter may be inserted upstream of the first capacitor in the capacitor bank, instead of the faulty capacitor, in this case. As such, the voltage which is otherwise present on two capacitors, is produced.

The voltage source for balancing can achieve the advantage that an increased balancing voltage is available using simple devices. Further, for the first time, it may allow rapid balancing, when required.

After charging the capacitors, normal operation is started for one capacitor, for example, when the capacitor voltage 4 reaches the lowest voltage level 3 and has not yet reached the central voltage level 2 (e.g. at segment 7 of the voltage curve 4). A balancing operation may start when the capacitor voltage has reached the central voltage level 2, and may end when the capacitor voltage has once again reached the lowest voltage level 3. When the lowest voltage level 3 is reached once again, normal operation is started again. A fault is indicated on reaching the highest voltage level 1. This can be initiated by a defective capacitor. These individual method steps ensure optimum balancing and fault indication.

In order to start balancing operation, the capacitor voltages of all the capacitors are raised above the central voltage level 2.

An apparatus for carrying out the method, according to an embodiment of the invention, may include a series circuit formed from a non-reactive resistor and a first transistor, arranged in parallel with in each case two or more capacitors in the capacitor bank. At least one further transistor may be connected in parallel with the first transistor. Further, transistors my be connected to an evaluation device, with voltage taps on the capacitors being connected to the evaluation device.

The capacitor bank may include, for example, four to eight capacitors, in particular six capacitors.

The desired voltage levels can thus be produced from the voltage of the capacitors that are to be balanced and/or to be monitored.

Even as few as only one voltage tap may be used for parallel-connected capacitors, since capacitors which are connected in parallel automatically balance one another. The number of components required may thus be reduced further.

Optocouplers, which are connected to the evaluation device, may be connected to the capacitors and can be used to transmit the voltage levels to a bus system. This can be achieved, for example, owing to the DC isolation which is required for this purpose.

A double coupler may also be used instead of three optocouplers.

The non-reactive resistor in the series circuit that is used for balancing is used as a discharge resistor and may, for example, be a large wire resistor. It may also be a flat-bottom resistor, an HSA resistor or else a cement resistor. The transistors are generally what are referred to as field-effect transistors. If necessary, these field-effect transistors may be equipped with heat sinks. The voltage of the reference voltage source is used as a gate driver voltage for the field-effect transistors. The desired voltage levels are produced as a function of the number of parallel-connected transistors and, possibly, on the basis of the configuration of the transistors.

In order to indicate a fault, the evaluation device may advantageously be connected to a light-emitting diode.

The method, according to an embodiment of the invention, and an apparatus for carrying out the method, may achieve an advantage that suitable voltage levels are provided using simple devices which then advantageously allow reliable statements to be made about the uniform charging of the capacitor bank, and about any possible defects in a capacitor, by comparison with the instantaneous voltage of one capacitor in a capacitor bank.

Advantageously, balancing may be carried out only when it is no longer possible to keep the capacitor voltages of all the capacitors between the two lower voltage levels 2, 3 (e.g., at segments 8 of the voltage curve 4).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for balancing capacitors in a capacitor bank, comprising:
    producing three voltage levels, inclusive of a relatively low voltage, a relatively central voltage level and a relatively high voltage level, from a reference voltage source, to monitor the state of charge of the capacitors,
    determining a capacitor voltage for each capacitor and comparing the determined voltages with the produced voltage levels;
    indicating a correct charge for a capacitor when a corresponding capacitor voltage is determined to be between the relatively low voltage level and the relatively central voltage level;
    indicating a fault in a capacitor when a corresponding capacitor voltage is greater than the relatively high voltage level; and
    balancing the capacitors only when neither a correct charge nor a fault is indicated;
    wherein balancing of each capacitor occurs in two voltage ranges that are separated from each other.

2. The method as claimed in claim 1, wherein a fault in a capacitor is indicated when a gradient of the capacitor voltage during the charging of the capacitor, exceeds a limit value.

3. The method as claimed in claim 2, wherein the voltage levels are supplied via optocouplers to an evaluation device.

4. The method as claimed in claim 2, wherein the reference voltage source uses a voltage present in the capacitor bank.

5. The method as claimed in claim 4, wherein a sum voltage across two capacitors in the capacitor bank is tapped off as a reference voltage source for balancing.

6. The method as claimed in claim 2, wherein, after charging the capacitors, normal operation is started for one capacitor when the corresponding capacitor voltage reaches the relatively low voltage level and before the corresponding capacitor voltage has reached the relatively central voltage level;
    wherein balancing begins when the corresponding capacitor voltage has reached the relatively central voltage level, and ends when the capacitor voltage has once again reached the relatively low voltage level;

wherein, when the relatively low voltage level is reached once again, normal operation is once again started, and wherein a fault is indicated upon reaching the relatively high voltage level.

7. The method as claimed in claim 6, wherein, in order to start balancing operation, the capacitor voltages of all the capacitors are raised above the relatively central voltage level.

8. The method as claimed in claim 1, wherein the voltage levels are supplied via optocouplers to an evaluation device.

9. The method as claimed in claim 8, wherein, after charging the capacitors, normal operation is started for one capacitor when the corresponding capacitor voltage reaches the relatively low voltage level and before the corresponding capacitor voltage has reached the relatively central voltage level;

wherein balancing begins when the corresponding capacitor voltage has reached the relatively central voltage level, and ends when the capacitor voltage has once again reached the relatively low voltage level;

wherein, when the relatively low voltage level is reached once again, normal operation is once again started, and wherein a fault is indicated upon reaching the relatively high voltage level.

10. The method as claimed in claim 9, wherein, in order to start balancing operation, the capacitor voltages of all the capacitors are raised above the relatively central voltage level.

11. The method as claimed in claim 1, wherein the reference voltage source uses a voltage present in the capacitor bank.

12. The method as claimed in claim 11, wherein a sum voltage across two capacitors in the capacitor bank is tapped off as a reference voltage source for balancing.

13. The method as claimed in claim 12, wherein, after charging the capacitors, normal operation is started for one capacitor when the corresponding capacitor voltage reaches the relatively low voltage level and before the corresponding capacitor voltage has reached the relatively central voltage level;

wherein balancing begins when the corresponding capacitor voltage has reached the relatively central voltage level, and ends when the capacitor voltage has once again reached the relatively low voltage level;

wherein, when the relatively low voltage level is reached once again, normal operation is once again started, and wherein a fault is indicated upon reaching the relatively high voltage level.

14. The method as claimed in claim 13, wherein, in order to start balancing operation, the capacitor voltages of all the capacitors are raised above the relatively central voltage level.

15. The method as claimed in claim 11, wherein, after charging the capacitors, normal operation is started for one capacitor when the corresponding capacitor voltage reaches the relatively low voltage level and before the corresponding capacitor voltage has reached the relatively central voltage level;

wherein balancing begins when the corresponding capacitor voltage has reached the relatively central voltage level, and ends when the capacitor voltage has once again reached the relatively low voltage level;

wherein, when the relatively low voltage level is reached once again, normal operation is once again started, and wherein a fault is indicated upon reaching the relatively high voltage level.

16. The method as claimed in claim 15, wherein, in order to start balancing operation, the capacitor voltages of all the capacitors are raised above the relatively central voltage level.

17. The method as claimed in claim 1, wherein, after charging the capacitors, normal operation is started for one capacitor when the corresponding capacitor voltage reaches the relatively low voltage level and before the corresponding capacitor voltage has reached the relatively central voltage level;

wherein balancing begins when the corresponding capacitor voltage has reached the relatively central voltage level, and ends when the capacitor voltage has once again reached the relatively low voltage level;

wherein, when the relatively low voltage level is reached once again, normal operation is once again started, and wherein a fault is indicated upon reaching the relatively high voltage level.

18. The method as claimed in claim 17, wherein, in order to start balancing operation, the capacitor voltages of all the capacitors are raised above the relatively central voltage level.

19. A method for balancing capacitors in a capacitor bank, comprising:

determining a capacitor voltage for a plurality of the capacitors;

comparing the determined voltages with at least three voltage levels, inclusive of a relatively low voltage level, a relatively central voltage level and relatively high voltage level, from a reference voltage source;

determining a correct charge for a capacitor upon a corresponding capacitor voltage being between low voltage level and the relatively central voltage level;

determining a fault for a capacitor upon a corresponding capacitor voltage being greater than a relatively high voltage level; and balancing capacitors upon neither a correct charge nor a fault being determined;

wherein balancing of each capacitor occurs in two voltage ranges that are separated from each other.

20. The method as claimed in claim 19, wherein a fault in a capacitor is determined when a gradient of the capacitor voltage during the charging of the capacitor, exceeds a limit value.

21. The method as claimed in claim 19, wherein the voltage levels are supplied via optocouplers to an evaluation device.

22. The method as claimed in claim 19, wherein the reference voltage source uses a voltage present in the capacitor bank.

23. The method as claimed in claim 22, wherein a sum voltage across two capacitors in the capacitor bank is tapped off as a reference voltage source for balancing.

24. The method as claimed in claim 19, wherein, after charging the capacitors, normal operation is started for one capacitor when the corresponding capacitor voltage reaches the relatively low voltage level and before the corresponding capacitor voltage has reached the relatively central voltage level;

wherein balancing begins when the corresponding capacitor voltage has reached the relatively central voltage level, and ends when the capacitor voltage has once again reached the relatively low voltage level;

wherein, when the relatively low voltage level is reached once again, normal operation is once again started, and wherein a fault is determined upon reaching the relatively high voltage level.

25. The method as claimed in claim 24, wherein, in order to start balancing operation, the capacitor voltages of all the capacitors are raised above the relatively central voltage level.

26. An apparatus for balancing capacitors in a capacitor bank, comprising:
    means for determining a capacitor voltage for a plurality of the capacitors;
    means for comparing the determined voltages with at least three voltage levels, inclusive of a relatively low voltage level, a relatively central voltage level and a relatively high voltage level, from a reference voltage source;
    means for determining a correct charge for a capacitor upon a corresponding capacitor voltage being between the relatively low voltage level and the relatively central voltage level;
    means for determining a fault for a capacitor upon a corresponding capacitor voltage being greater than a relatively high voltage level; and
    means for balancing capacitors upon neither a correct charge nor a fault being determined;
    wherein balancing of each capacitor occurs in two voltage ranges that are separated from each other.

27. The apparatus as claimed in claim 26, wherein a fault in a capacitor is determined when a gradient of the capacitor voltage during the charging of the capacitor, exceeds a limit value.

28. The apparatus as claimed in claim 26, wherein the voltage levels are supplied via optocouplers to an evaluation device.

29. The apparatus as claimed in claim 26, wherein the reference voltage source uses a voltage present in the capacitor bank.

30. The apparatus as claimed in claim 29, wherein a sum voltage across two capacitors in the capacitor bank is tapped off as a reference voltage source for balancing.

31. The apparatus as claimed in claim 26, wherein, after charging the capacitors, normal operation is started for one capacitor when the corresponding capacitor voltage reaches the relatively low voltage level and before the corresponding capacitor voltage has reached the relatively central voltage level;
    wherein balancing begins when the corresponding capacitor voltage has reached the relatively central voltage level, and ends when the capacitor voltage has once again reached the relatively low voltage level;
    wherein, when the relatively low voltage level is reached once again, normal operation is once again started, and wherein a fault is determined upon reaching the relatively highest voltage level.

32. The apparatus as claimed in claim 31, wherein, in order to start balancing operation, the capacitor voltages of all the capacitors are raised above the relatively central voltage level.

33. An apparatus for balancing capacitors in a capacitor bank, comprising:
    a series circuit, formed from a non-reactive resistor and a first transistor, arranged in parallel with at least two capacitors in the capacitor bank; and
    at least one further transistor, connected in parallel with the first transistor, the transistors being connected to an evaluation device, wherein at least three voltage levels are produced from a reference voltage source, wherein a capacitor voltage is determined and compared to the at least three voltage levels, and wherein balancing of the capacitors begins when the capacitor voltage of all of the capacitors reaches a relatively central voltage level and ends when the capacitor voltage of all of the capacitors reaches the relatively low voltage level;
    wherein a fault is indicated in a capacitor when a corresponding capacitor voltage is greater than the relatively high voltage level; and
    wherein balancing of each capacitor occurs in two voltage ranges that are separated from each other.

34. The apparatus of claim 33, wherein a correct charge for a capacitor is indicated when a corresponding capacitor voltage is determined to be between the relatively low voltage level and the relatively central voltage level, and wherein a fault in a capacitor is indicated when a corresponding capacitor voltage is greater than the relatively high voltage level.

35. The apparatus of claim 33, wherein voltage taps on the capacitors are connected to the evaluation device.

36. The apparatus of claim 33, wherein, when the relatively low voltage level is reached once again, normal operation is again started, and wherein a fault is indicated upon reaching the relatively high voltage level.

37. A method for balancing capacitors in a capacitor bank, comprising:
    determining a capacitor voltage of each capacitor in the capacitor bank;
    comparing each capacitor voltage to at least three voltage levels, inclusive of a relatively low voltage level, a relatively central voltage level and relatively high voltage level, produced from a reference source;
    balancing the capacitors upon the capacitor voltage of all of the capacitors reaching a relatively central voltage level and end the balancing upon the capacitor voltage of all of the capacitors reaching a relatively lower voltage level; and
    indicating a fault in a capacitor when a corresponding capacitor voltage is greater than the relatively high voltage level;
    wherein balancing of each capacitor occurs in two voltage ranges that are separated from each other.

38. The method of claim 37, wherein, upon the relatively low voltage level being reached once again, normal operation is again started, and wherein a fault is indicated upon reaching the relatively high voltage level.

39. The method of claim 37, further comprising:
    determining a correct charge for a capacitor upon a corresponding capacitor voltage being between the relatively low voltage and the relatively central voltage level;
    determining a fault for a capacitor upon a corresponding capacitor voltage being greater than a relatively high voltage level; and
    balancing capacitors upon neither a correct charge nor a fault being determined.

40. An apparatus for balancing capacitors in a capacitor bank, comprising:
    means for determining a capacitor voltage of each capacitor in the capacitor bank;
    means for comparing each capacitor voltage to at least three voltage levels, inclusive of a relatively low voltage level, a relatively central voltage level and relatively high voltage level, produced from a reference source; and
    means for balancing the capacitors upon the capacitor voltage of all of the capacitors reaching a relatively central voltage level and end the balancing upon the capacitor voltage of all of the capacitors reaching a relatively lower voltage level;

wherein balancing of each capacitor occurs in two voltage ranges that are separated from each other; and wherein a fault is indicated in a capacitro when a corresponding capacitor voltage is greater than the relatively high voltage level.

41. An apparatus for balancing capacitors in a capacitor bank, comprising:

a series circuit formed from a non-reactive resistor and a first transistor, arranged in parallel with a least two capacitors in the capacitor bank; and at least one further transistor, connected in parallel with the first transistor;

wherein the transistor are connected to an evaluation device, wherein voltage taps on the capacitors are connected to the evaluation device, wherein at least three voltage levels, inclusive of a relatively low voltage level, a relatively central voltage level and a relatively high voltage level, are produced from a reference voltage source, wherein a capacitor voltage is determined and compared to the at least three voltage levels, and wherein a fault is indicated in a capacitor when a corresponding capacitor voltage is greater than the relatively high voltage level; and wherein balancing of each capacitor occurs in two voltage ranges that are separated from each other.

42. The apparatus as claimed in claim 41, further comprising optocouplers, adapted to transmit the voltage levels to a bus system.

43. The apparatus as claimed in claim 42, wherein a double coupler is used instead of three optocouplers.

* * * * *